(12) United States Patent
Haines et al.

(10) Patent No.: US 6,922,257 B2
(45) Date of Patent: Jul. 26, 2005

(54) IMAGE FORMING DEVICES AND METHODS OF FACILITATING ORDERING OF AN IMAGING CONSUMABLE

(75) Inventors: Robert E. Haines, Boise, ID (US); Mark A. Harper, Middleton, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 923 days.

(21) Appl. No.: 09/738,794

(22) Filed: Dec. 13, 2000

(65) Prior Publication Data

US 2002/0071137 A1 Jun. 13, 2002

(51) Int. Cl.$^7$ .............................. G06F 3/12; G06F 13/00
(52) U.S. Cl. ........................ 358/1.15; 358/1.14; 358/1.9
(58) Field of Search ............................... 358/1.15, 1.9, 358/1.13, 1.14, 401, 402, 403, 409, 410, 426.05, 426.09, 443; 710/7, 8, 19, 46; 709/102, 103, 223, 224

(56) References Cited

U.S. PATENT DOCUMENTS

| | | | |
|---|---|---|---|
| 6,522,421 B2 * | 2/2003 | Chapman et al. | 358/1.15 |
| 6,735,641 B1 * | 5/2004 | Kobayashi et al. | 710/15 |
| 6,758,316 B2 * | 7/2004 | Molbak | 194/200 |

* cited by examiner

Primary Examiner—Douglas Q. Tran

(57) ABSTRACT

Image forming devices and methods of facilitating ordering of an imaging consumable are described. According to one aspect, an image forming device includes an interface adapted to communicate with a communication medium external of the image forming device; imaging circuitry configured to use an imaging consumable to form hard images; a sensor configured to monitor a status of the imaging consumable; and processing circuitry coupled with the sensor and configured to generate a message indicating the status of the imaging consumable and to synchronize with another image forming device to control a timing of a communication of the message externally of the image forming device using the interface.

33 Claims, 2 Drawing Sheets

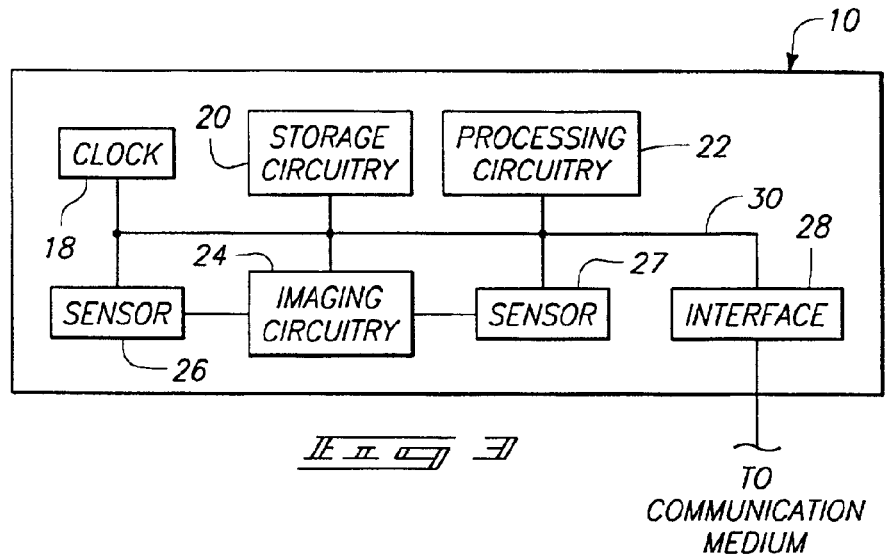
$F_{I} \square \square \square$
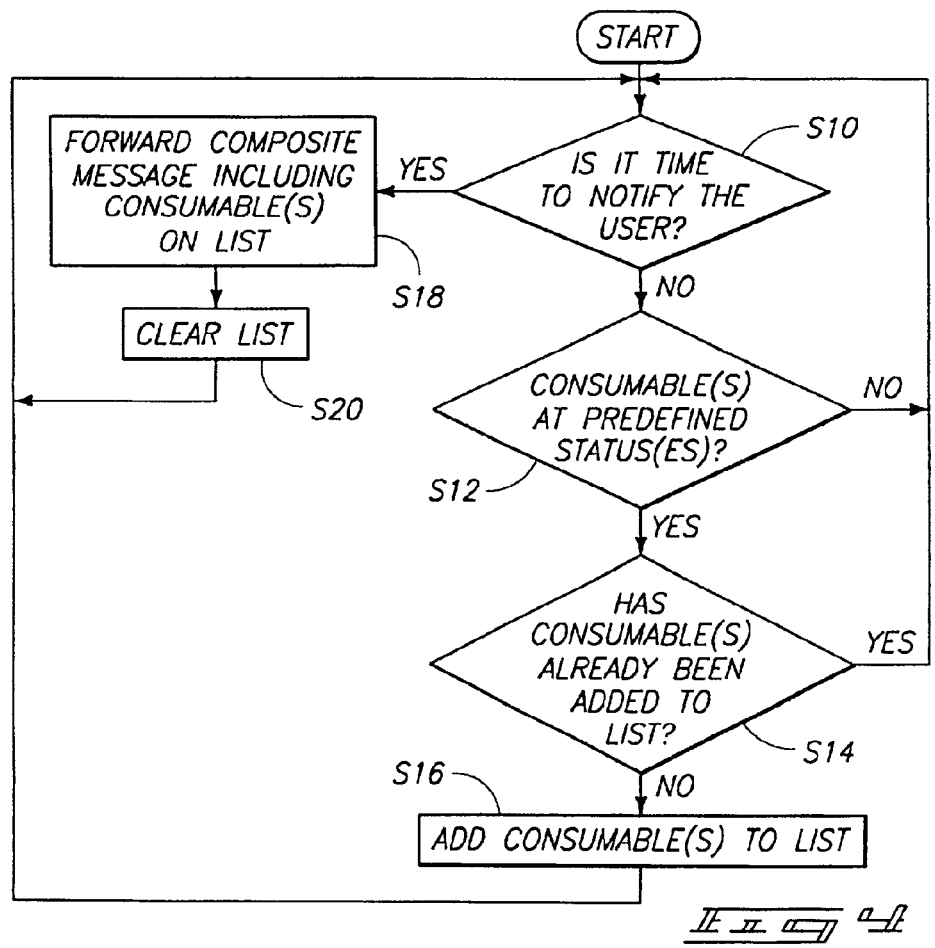
$F_{I} \square \square \square \square$

IMAGE FORMING DEVICES AND METHODS OF FACILITATING ORDERING OF AN IMAGING CONSUMABLE

FIELD OF THE INVENTION

This invention pertains to image forming devices and methods of facilitating ordering of an imaging consumable.

BACKGROUND OF THE INVENTION

Systems and methods relating to document generation have experienced great advancements in both host device configurations, such as personal computers, and imaging devices, such as printers. Personal computers operate at faster processing rates with increased storage capacities while imaging devices provide tremendous resolution, color capabilities, and enhanced imaging speeds, for example.

Imaging systems arranged to generate hard images are ubiquitous in the workplace. Network systems are often coupled with numerous imaging devices, for example, which provide imaging capabilities at various locations within a work environment. Imaging devices configured to generate hard images use consumables during operation. Expiration of a consumable ceases operation of the corresponding imaging device until replacement of the same.

In some imaging system arrangements, such as network based arrangements comprising numerous imaging devices, a person is assigned with monitoring consumable usage, reordering consumables, etc. to maintain operability of the imaging devices. Such entails the individual manually verifying the amount of consumables remaining within inventory, manually monitoring status of consumables of the respective devices and replenishment of the consumables in inventory and within individual imaging devices when necessary. In systems having perhaps hundreds of imaging devices, the task of monitoring, replacing and maintaining consumables for such imaging devices is increasingly time consuming and subject to misordering of consumables and other errors.

Accordingly, there exists a need to provide improved devices and methodologies to assist with management of imaging consumables.

SUMMARY OF THE INVENTION

The invention provides image forming devices and methods of facilitating ordering of an imaging consumable.

According to one aspect, an image forming device includes an interface adapted to communicate with a communication medium external of the image forming device; imaging circuitry configured to use an imaging consumable to form hard images; a sensor configured to monitor a status of the imaging consumable; and processing circuitry coupled with the sensor and configured to generate a message indicating the status of the imaging consumable and to synchronize with another image forming device to control a timing of a communication of the message externally of the image forming device using the interface.

A second aspect of the invention provides a image forming device comprising: an interface adapted to communicate with a communication medium external of the image forming device; imaging circuitry configured to use an imaging consumable to form hard images; a sensor configured to monitor a status of the imaging consumable; and processing circuitry coupled with the sensor and configured to generate a message indicating the status of the imaging consumable and to communicate the message externally of the image forming device using the interface at a predetermined moment in time.

Another aspect of the invention provides a image forming device comprising: an interface adapted to communicate with a communication medium; imaging circuitry configured to consume a plurality of imaging consumables to form hard images; a plurality of sensors configured to monitor respective statuses of the imaging consumables; and processing circuitry coupled with the sensors and configured to generate a composite message indicating statuses of the imaging consumables, and to forward the composite message to the interface for communication externally of the image forming device.

Another aspect of the invention provides a method of facilitating ordering of an imaging consumable comprising: providing an image forming device configured to use the imaging consumable to form hard images; monitoring a status of the imaging consumable; generating a message indicating the status of the imaging consumable responsive to the monitoring; synchronizing with another image forming device; and communicating the message externally of the image forming device responsive to the synchronizing.

Yet another aspect of the present invention comprises a method of facilitating ordering of an imaging consumable comprising: providing an image forming device configured to use the imaging consumable to form hard images; monitoring a status of the imaging consumable; generating a message indicating the status of the imaging consumable responsive to the monitoring; and communicating the message externally of the image forming device at a predetermined moment in time. Other aspects of the present invention are disclosed herein.

Other features and advantages of the invention will become apparent to those of ordinary skill in the art upon review of the following detailed description, claims, and drawings.

DESCRIPTION OF THE DRAWINGS

FIG. 3 is a functional block diagram of an exemplary image forming device.

FIG. 4 is a flow chart depicting an exemplary methodology executable within the image forming device.

DETAILED DESCRIPTION OF PREFERRED EMBODIMENTS

Figure 1:
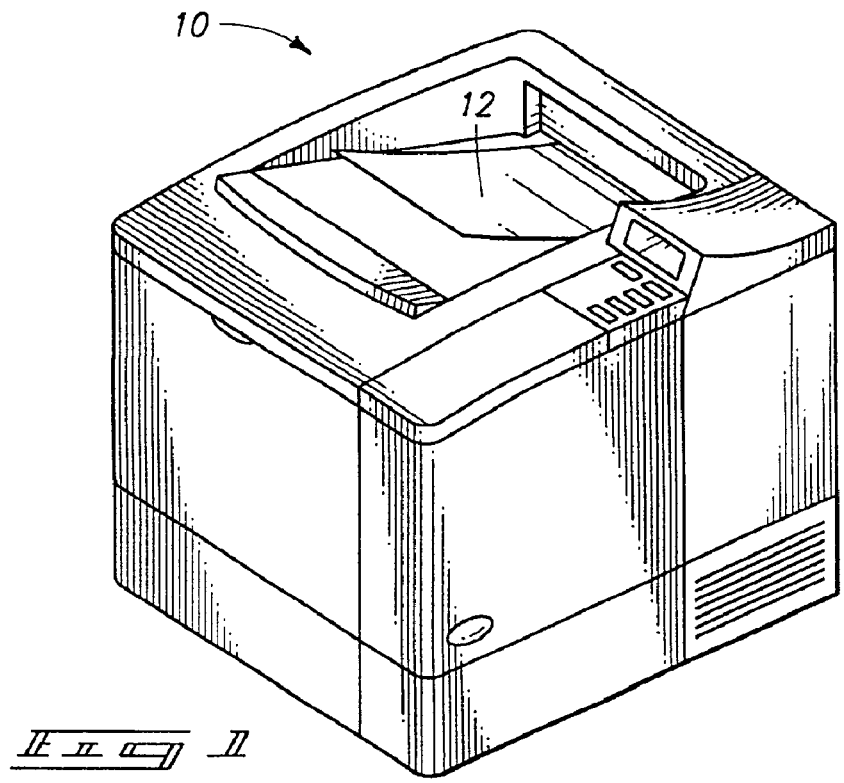
FIG. 1 is an isometric view of an exemplary image forming device embodying aspects of the present invention.

FIG. 1 depicts an exemplary image forming device 10. Image forming device 10 is configured to form hard images upon media 12 in the described embodiment. One exemplary image forming device 10 comprises a printer, such as a laser printer, ink jet printer, a dot matrix printer, or a dry medium printer. The present invention is embodied within other image forming device configurations such as multiple function peripheral devices, copiers, facsimile machines, plotters, etc. or other arrangements configured to form hard images upon media 12 according to alternative embodiments of the invention. Device 10 is arranged to form hard images upon media 12 including, for example, paper, envelopes, transparencies, labels, etc.

Figure 2:
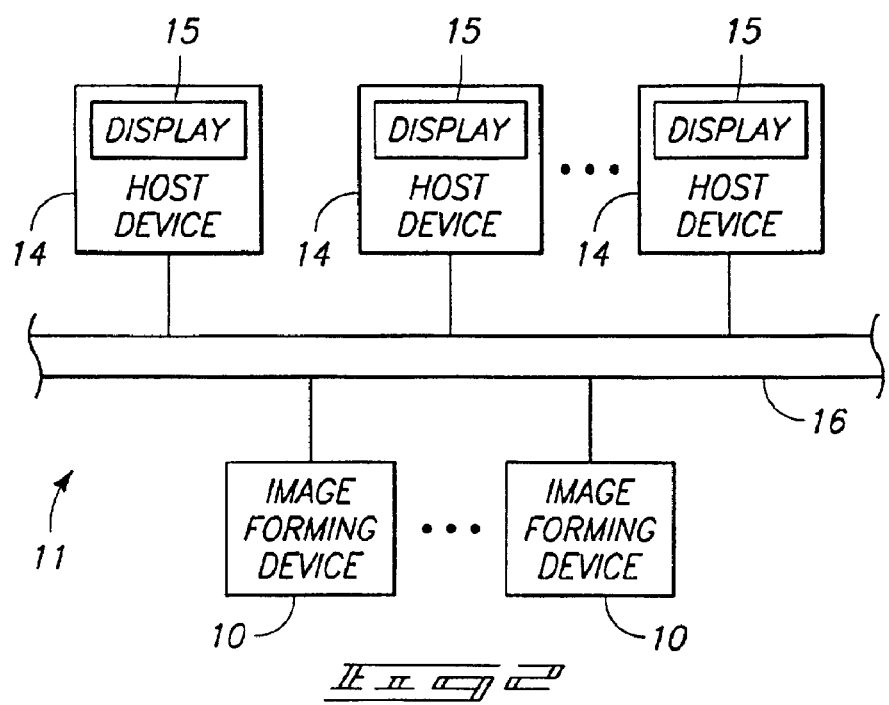
FIG. 2 is an illustrative representation of an exemplary image forming system embodying aspects of the present invention.

Referring to FIG. 2, an image forming system 11 is depicted comprising plural image forming devices 10, plural host devices 14 and a communication medium 16. Communication medium 16 provides connectivity intermediate image forming devices 10 and host devices 14 to implement communications therebetween. An exemplary communication medium 16 includes packet switched networks such as an Intranet network (e.g., Ethernet arrangement), Internet and/or other communication configurations operable to provide electronic exchange of information between image forming devices 10 and host devices 14, using an appropriate protocol, such as TCP/IP. Some of depicted devices 10, 14 of system 11 may be coupled with an Intranet portion of medium 16 while other devices 10, 14 are coupled with an Internet portion of medium 16. Other image forming systems 11 of the invention include more or less devices 10, 14 depending upon a given configuration or application. Further, other arrangements of communication medium 16 and other protocols for implementing communications intermediate devices 10, 14, are possible.

In general, host devices 14 are implemented as personal computers (PCs), servers, or other devices configured to communicate with image forming devices 10. Host devices 14 individually include a display 15, such as a CRT or flat panel monitor, to display information to a user.

At least some host devices 14 execute applications wherein formation of hard images upon media is desired. For example, host devices 14 comprising personal computers in one exemplary configuration execute an appropriate word processor, spread sheet, or other application capable of generating documents having images thereon. Individual host devices 14 communicate image data via communication medium 16 to an appropriate image forming device 10 for hard imaging. Alternatively, image data to be printed or otherwise imaged using image forming devices 10 is supplied from other external devices (not shown) coupled with, for example, communication medium 16.

Referring to FIG. 3, exemplary components of a single image forming device 10 are shown. As illustrated, the depicted image forming device 10 includes a clock 18, storage circuitry 20, processing circuitry 22, imaging circuitry 24, a sensor 26, a sensor 27, and an interface 28 individually coupled with a communication medium 30. Communication medium 30 is configured as an internal bus to implement communication functionality intermediate components of image forming device 10. Other configurations of image forming device 10 are provided in alternative arrangements (not shown).

Clock 18 is arranged to provide information regarding current moments in time. For example, clock 18 provides year, month, day and/or time information. In the depicted configuration, clock 18 is programmed upon installation within system 11. Updated timing information to verify the accuracy of clock 18 or to control timing within device 10 may be received from a timing source (not shown) external of image forming device 10.

Storage circuitry 20 is configured to store instructions for controlling various operations of image forming device 10 and other information or data as described in further detail below. Exemplary storage circuitry 20 comprises non-volatile memory (e.g., EEPROM, flash memory and/or read only memory (ROM)), random access memory (RAM), and hard disk and associated drive circuitry. Storage circuitry 20 is configured to store executable instructions as firmware or software configured to control operations of image forming device 10. Further, storage circuitry 20 stores image data used for the formation of hard images and any other appropriate information to be stored within image forming device 10.

Processing circuitry 22 is implemented as a dedicated microprocessor in the depicted embodiment of image forming device 10. Other arrangements of processing circuitry 22 are possible. Processing circuitry 22 is configured to execute a plurality of ordered executable instructions implemented as firmware and/or software. The ordered instructions are executed to control image forming operations within image forming device 10, to provide monitoring of components of device 10, to provide monitoring of imaging consumables used during imaging operations, and other operations of device 10.

Imaging circuitry 24 is configured to form hard images upon media 12 responsive to image data. In the described printer embodiment, imaging circuitry 24 includes print circuitry arranged to print images upon media 12. In the exemplary described embodiment, imaging circuitry 24 includes paper path components (not shown) to implement movement of media 12 within image forming device 10, developing components (not shown) configured to provide a developing material, such as toner, upon media 12, fusing components (not shown) configured to affix the developing material to media 12 as well as any other components (not shown) to implement other desired processing or imaging operations, such as downstream processing of media (e.g., stapling, collating, etc).

Sensors 26, 27 are provided in the disclosed embodiment to monitor operations within imaging circuitry 24 of image forming device 10. Imaging circuitry 24 consumes imaging consumables during the formation of hard images. Exemplary imaging consumables include developing material, media, staples, and components having a fixed life span (e.g., fusing assembly and/or developing assembly). Plural sensors 26, 27 are provided to monitor plural imaging consumables, such as developing material and media, according to some aspects of the invention. More or less sensors are provided in other configurations of image forming device 10. Further, other imaging consumables may also be monitored depending upon the configuration of image forming device 10.

In the described embodiment, sensors 26, 27 are arranged to monitor respective statuses of plural imaging consumables. Status of an imaging consumable may be represented in a plurality of ways. For example, sensors 26, 27 are arranged in one embodiment to monitor remaining capacities of respective imaging consumables (e.g., amount of toner in weight or volume remaining for usage, amount of fuser life in hours remaining for usage). Alternatively, sensors 26, 27 are configured to monitor usage of the respective imaging consumables. Sensors 26, 27 may be additionally configured to indicate both remaining capacity and usage of respective consumables. The remaining capacity and/or usage information may be indicated in terms of weight, volume, hours, or any other unit capable of indicating usage or remaining capacity of the respective imaging consumables.

Sensors 26, 27 are configured to output respective signals indicative of the statuses (e.g., usage and/or remaining life) of imaging consumables to communication medium 30. Processing circuitry 22 is configured to receive and process the respective signals from medium 30.

Interface 28 is configured to implement connectivity of image forming device 10 to external components via an appropriate communication medium, for example. An exemplary interface 28 comprises a network interface card (NIC), such as a JetDirect™ card, available from Hewlett-Packard Company. In the illustrated embodiment, interface 28 is coupled with communication medium 16. Image data, status information and any other desired data is received within and outputted from image forming device 10 using interface 28 in the described implementation.

According to aspects of the present invention, image forming device 10 is operable to implement various functions regarding usage of imaging consumables during imaging and other operations, and replenishing of such imaging consumables. As previously mentioned, sensors 26, 27 are arranged to monitor statuses of respective imaging consumables. Sensors 26, 27 output signals indicative of the statuses of the respective imaging consumables.

Image forming device 10 arranged according to aspects of the present invention assists a user (e.g., purchaser or other desired entity concerned with maintenance of consumables) with replenishment of imaging consumables responsive to signals received from sensors 26, 27. Image forming device 10 is operable to output an indication of the statuses of respective imaging consumables externally of device 10 using interface 28.

More specifically, and in one exemplary configuration, processing circuitry 22 receives the generated signals regarding statuses of imaging consumables from respective sensors 26, 27. Processing circuitry 22 formulates messages which are forwarded externally of device 10 to appropriate recipients for facilitating reordering of imaging consumables. As described below, exemplary messages generated by processing circuitry 22 include status messages identifying the imaging consumable and/or the status of the imaging consumable of device 10. Alternatively, processing circuitry 22 generates a composite message regarding the identification and/or statuses of plural imaging consumables, and/or a composite message regarding plural statuses of one imaging consumable and perhaps an identification of the imaging consumable.

In one implementation, one of the provided host devices 14 of system 11 is associated with a purchaser of imaging consumables for respective ones of image forming devices 10 or other described recipient. In such a configuration, an e-mail address, uniform resource locator (URL) or other identifier of such host device 14 is provided within storage circuitry 20 of respective image forming devices 10 which are monitored by the purchaser or recipient.

Following an indication from sensors 26, 27 of one or more imaging consumable being at a predetermined status (e.g., low remaining capacity), processing circuitry 22 formulates an appropriate message for application to the given host device 14 as identified by the identifier stored within storage circuitry 20. In the depicted embodiment, processing circuitry 22 configures messages as e-mail messages for communication using communication medium 16. Other formats of messages are possible.

In another arrangement, processing circuitry 22 formulates an appropriate message indicating status(es) of imaging consumable(s) without such status(es) having reached any predetermined status(es). Such provides updates of status(es) of respective imaging consumables.

According to aspects of the present invention, one or more image forming device 10 of image forming system 11 is configured to synchronize with one or more other device 10 to control timing of communication of messages regarding status(es) of one or more imaging consumable to the proper host device 14. In one configuration, processing circuitry 22 is configured to detect a predetermined moment in time as provided by clock 18 to synchronize with one or more other image forming device 10.

For example, individual storage circuits 20 of respective image forming devices 10 store a common predetermined or reference time (e.g., year, month, day, and/or time) used to control application of messages to the proper host device 14. Within an individual device 10 and during operation, processing circuitry 22 accesses the predetermined moment in time from storage circuitry 20 and upon the detection of the predetermined moment in time, generates and forwards appropriate messages to host device 14. The predetermined moment in time is initially set within device 10 upon installation of the same within system 11 and may be updated or changed after initially set.

Accordingly, image forming devices 10 of system 11 are configured in one aspect of the described arrangement to forward messages regarding imaging consumable statuses to the given host device 14 at the same or proximate moments in time. Forwarding of such synchronized messages from image forming devices 10 facilitates the assembling by an appropriate user of a complete order for imaging consumables for the respective communicating devices 10. The user receiving the messages formulates a complete order to be supplied to the reseller or other supplier of the imaging consumables.

According to additional aspects of the present invention, image forming devices 10 are individually configured to generate a composite message comprising a plurality of statuses corresponding to one or more imaging consumables. In particular, a plurality of statuses may be generated responsive to one or more of sensors 26, 27 detecting statuses of one or more respective imaging consumable.

For example, one of sensors 26, 27 generates a signal corresponding to status of a respective consumable. At another moment in time, the same or other one of sensors 26, 27 generates another signal corresponding to a status of the respective same or other imaging consumable. Processing circuitry 22 is configured to receive the signals, generate messages regarding the consumable statuses (e.g., individually identifying the consumable and/or the status of the consumable), and to forward the messages to storage circuitry 20 for storage upon a list. Thereafter, processing circuitry 22 generates a composite message comprising the stored messages upon the list within storage circuitry 20 and forwards the composite message to interface 28 for communication to the appropriate host device 14. Such operation facilitates ordering of consumables from the given image forming device 10 and provides necessary orders within a single composite message over a given time period. Such additionally alleviates the sending of numerous single consumable status messages from a given single device 10 which require subsequent compilation by the user.

In accordance with previous described aspects of the present invention, processing circuitry 22 is configured in one arrangement to forward the composite message to interface 28 for communication to the appropriate host device 14 at a predetermined moment in time. Such operates to synchronize communication of composite messages from image forming devices 10 of system 11.

Alternatively, other criteria is utilized to determine timing of communication of a given composite message. For example, communication of the composite message is predicated upon the number of statuses saved within storage circuitry 20 within a device 10.

Referring to FIG. 4, an exemplary methodology for implementing above-described aspects of the present invention is shown. The depicted methodology is implemented as a series of ordered executable instructions stored within storage circuitry 20 which are presented to processing circuitry 22 for execution. In other alternative configurations, the depicted methodology is implemented in hardware.

The methodology of FIG. 4 depicts synchronization and composite message functionality in accordance with aspects of the present invention. According to other methodologies (not shown) of the present invention, only one of synchronization or composite message generation functionality is provided for execution within a device 10.

As shown in FIG. 4 and at a step S10, processing circuitry 22 retrieves the current time information (e.g., year, month, day and/or time) from clock 18 and determines whether it is time to notify the appropriate user (e.g., purchaser).

Processing circuitry 22 proceeds to a step S12 if the condition of step S10 is negative. At step S12, it is determined whether one or more of imaging consumables being monitored by sensors 26, 27 are at a predefined status (e.g., remaining capacity is low). If the condition of step S12 is negative, processing circuitry 22 returns to step S10.

Alternatively, if the condition of step S12 is affirmative, processing circuitry 22 proceeds to a step S14 to determine whether the imaging consumable having the status indication as determined by step S12 has already been added to a list. If so, processing circuitry 22 returns to step S10.

Otherwise, processing circuitry 22 proceeds to a step S16 to add the imaging consumable having the status indication to a list stored within storage circuitry 20. Thereafter, processing circuitry 22 returns to step S10.

If the condition of step S10 is in the affirmative, processing circuitry 22 proceeds to a step S18 to forward a composite message including the imaging consumables on the list stored within storage circuitry 20. The composite message is forwarded to interface 28 for communication to medium 16 and appropriate host device 14 or other appropriate destination.

Thereafter, and at a step S20, processing circuitry 22 clears the list within storage circuitry 20 and returns to step S10.

Aspects of the present invention provide forwarding of status messages from a plurality of image forming devices 10 to a host device 14 associated with a purchaser of imaging consumables, or other responsible individual, at predetermined moments in time.

Other aspects of the present invention include providing a composite message regarding statuses of one or more imaging consumable for communication to the appropriate host device 14. Such facilitates compilation by the purchaser or other individual of a plurality of imaging consumables to be ordered for one or more of image forming devices 10.

The purchaser or other individual reviews status messages received at the predetermined moment in time from the associated image forming devices 10 to compile the purchase order for imaging consumables. Such eliminates the steps of having the purchaser locate, retrieve and tally all status messages sent since the last purchase order during compilation of the next purchase order. Provision of composite messages according to other aspects of the present invention eliminates the steps of having the purchaser or other individual locate and tally numerous individual status messages which may be communicated from a single image forming device 10 during a given time period.

The protection sought is not to be limited to the disclosed embodiments, which are given by way of example only, but instead is to be limited only by the scope of the appended claims.

What is claimed is:

1. An image forming device comprising:
   an interface adapted to communicate with a communication medium external of the image forming device;
   imaging circuitry configured to use an imaging consumable to form hard images;
   a sensor configured to monitor a status of the imaging consumable; and
   processing circuitry coupled with the sensor and configured to generate a message indicating the status of the imaging consumable and to synchronize with another image forming device to control a timing of a communication of the message externally of the image forming device using the interface.

2. The device in accordance with claim 1 wherein the processing circuitry is configured to detect a predetermined moment in time to synchronize with the another image forming device.

3. The device in accordance with claim 1 wherein the imaging circuitry is configured to print hard images upon media.

4. The device in accordance with claim 1 wherein the interface is adapted to communicate with the communication medium comprising a packet-switched network, and the processing circuitry is configured to formulate the message comprising an e-mail message.

5. The device in accordance with claim 1 wherein the processing circuitry is configured to generate the message comprising a status message including one status.

6. The device in accordance with claim 1 wherein the processing circuitry is configured to generate the message comprising a composite message including a plurality of statuses corresponding to at least one imaging consumable.

7. An image forming device comprising:
   an interface adapted to communicate with a communication medium external of the image forming device;
   imaging circuitry configured to use an imaging consumable to form hard images;
   a sensor configured to monitor a status of the imaging consumable; and
   processing circuitry coupled with the sensor and configured to generate a message indicating the status of the imaging consumable and to communicate the message externally of the image forming device using the interface at a moment in time determined internally of the image forming device.

8. The device in accordance with claim 7 wherein the imaging circuitry is configured to print hard images upon media.

9. The device in accordance with claim 7 wherein the interface is adapted to communicate with the communication medium comprising a packet-switched network, and the processing circuitry is configured to formulate the message comprising an e-mail message.

10. The device in accordance with claim 7 wherein the processing circuitry is configured to generate the message comprising a composite message including a plurality of statuses corresponding to at least one imaging consumable.

11. An image forming device comprising:
    an interface adapted to communicate with a communication medium;
    imaging circuitry configured to consume a plurality of imaging consumables to form hard images;
    a plurality of sensors configured to monitor respective statuses of the imaging consumables; and processing circuitry coupled with the sensors and configured to generate a composite message indicating statuses of the imaging consumables, and to forward the composite message to the interface for communication externally of the image forming device at substantially the same moment in time that another image forming device communicates another message which includes a status of an imaging consumable of the another image forming device.

12. The device in accordance with claim 11 wherein the processing circuitry is configured to synchronize with the another image forming device to control the timing of the communication of the composite message.

13. The device in accordance with claim 12 wherein the processing circuitry is configured to send the composite message at a predetermined moment in time to synchronize with the another image forming device.

14. The device in accordance with claim 11 wherein the imaging circuitry is configured to print hard images upon media.

15. The device in accordance with claim 11 wherein the interface is adapted to communicate with the communication medium comprising a packet-switched network, and the processing circuitry is configured to formulate the composite message comprising an e-mail message.

16. The device in accordance with claim 11 further comprising storage circuitry and the processing circuitry is configured to process signals from the sensors and to forward statuses responsive to the signals to the storage circuitry for storage.

17. A method of facilitating ordering of an imaging consumable comprising:

providing an image forming device configured to use the imaging consumable to form hard images;

monitoring a status of the imaging consumable;

generating a message indicating the status of the imaging consumable responsive to the monitoring;

synchronizing with another image forming device; and communicating the message externally of the image forming device responsive to the synchronizing.

18. The method in accordance with claim 17 wherein the synchronizing comprises detecting a predetermined moment in time.

19. The method in accordance with claim 17 wherein the providing comprises providing the image forming device configured to print hard images upon media.

20. The method in accordance with claim 17 wherein the communicating comprises communicating the message comprising an e-mail message.

21. The method in accordance with claim 17 wherein the generating comprises generating the message comprising a composite message including a plurality of statuses corresponding to at least one imaging consumable.

22. A method of facilitating ordering of an imaging consumable comprising:

providing an image forming device configured to use the imaging consumable to form hard images;

monitoring a status of the imaging consumable;

generating a message indicating the status of the imaging consumable responsive to the monitoring; and communicating the message externally of the image forming device at a moment in time determined internally of the image forming device.

23. The method in accordance with claim 22 wherein the communicating comprises communicating the message comprising an e-mail message.

24. The method in accordance with claim 22 wherein the generating comprises generating the message comprising a composite message including a plurality of statuses corresponding to at least one imaging consumable.

25. The device in accordance with claim 1 wherein the processing circuitry is configured to synchronize with the another image forming device to control the communication of the message at substantially the same moment in time that the another image forming device communicates another message which includes a status of an imaging consumable of the another image forming device.

26. The device in accordance with claim 7 wherein the processing circuitry is configured to determine the moment in time using criteria stored internally of the image forming device.

27. The device in accordance with claim 7 wherein the processing circuitry is configured to determine the moment in time using criteria originating within the image forming device.

28. The device in accordance with claim 11 wherein the processing circuitry is configured to determine the moment in time using criteria stored internally of the image forming device.

29. The device in accordance with claim 11 wherein the processing circuitry is configured to determine the moment in time using criteria originating within the image forming device.

30. The method in accordance with claim 17 wherein the synchronizing comprises synchronizing the image forming device with another image forming device.

31. The method in accordance with claim 17 wherein the communicating comprises communicating the message at substantially the same moment in time that the another image forming device communicates another message which includes a status of an imaging consumable of the another image forming device.

32. The method in accordance with claim 22 further comprising, using the image forming device, determining the moment in time using criteria stored internally of the image forming device.

33. The method in accordance with claim 22 further comprising, using the image forming device, determining the moment in time using criteria originating within the image forming device.

* * * * *